US006361877B1

(12) United States Patent
Miyai et al.

(10) Patent No.: US 6,361,877 B1
(45) Date of Patent: Mar. 26, 2002

(54) THERMAL SPRAY MATERIAL COMPRISING AL-SI ALLOY POWDER AND A STRUCTURE HAVING A COATING OF THE SAME

(75) Inventors: Kenji Miyai; Seiya Kunioka, both of Hamamatsu; Tadashi Takahashi, Hamana-Gun, all of (JP)

(73) Assignee: Suzuki Motor Corporation (JP)

( * ) Notice: Subject to any disclaimer, the term of this patent is extended or adjusted under 35 U.S.C. 154(b) by 0 days.

(21) Appl. No.: 09/490,967

(22) Filed: Jan. 24, 2000

(30) Foreign Application Priority Data

Jan. 27, 1999 (JP) .......................................... 11-017917

(51) Int. Cl.[7] .................................................. B32B 5/16

(52) U.S. Cl. ....................... 428/546; 427/452; 427/456; 428/650; 428/653

(58) Field of Search ................................ 428/546, 650, 428/653; 427/452, 456

(56) References Cited

U.S. PATENT DOCUMENTS 5,194,304 A * 3/1993 McCune, Jr. et al. ....... 427/449
5,385,789 A * 1/1995 Rangaswamy et al. ..... 428/570
5,795,659 A * 8/1998 Meelu et al. ............... 428/610
5,958,522 A * 9/1999 Nakagawa et al. ......... 427/456
6,165,286 A * 12/2000 Bayer et al. ................ 148/220
6,264,766 B1 * 7/2001 Ritter et al. ................ 148/525
6,267,829 B1 * 7/2001 Backerud et al. ........... 148/415

FOREIGN PATENT DOCUMENTS

JP 51-18004 6/1976
JP 52-93539 4/1977

* cited by examiner

*Primary Examiner*—Hoa T. Le
(74) *Attorney, Agent, or Firm*—Morrison Law Firm

(57) ABSTRACT

A thermal spray material includes a mixture of 5–30 weight % of an AlSi alloy powder with 95–70 weight percent of a cast iron powder to provide abrasion resistance for aluminum alloy parts. The AlSi alloy powder contains 12–30 weight % Si, at least one element selected from a group consisting of 0.5–5.0 weight % Cu and 0.2–3.0 weight % Mg, 1–15% of at least one element selected from the group consisting of Fe, Mn, and Ni, and a mass balance of Al. The cast iron powder contains 2–4 weight % C, no more than 0.3 weight % Si, and 0.5–3.0 weight % P. A sliding surface of a sliding member is thermal sprayed with a coating of this thermal spray material to provide a sliding member having excellent abrasion resistance.

14 Claims, 7 Drawing Sheets

THERMAL SPRAY MATERIAL COMPRISING AL-SI ALLOY POWDER AND A STRUCTURE HAVING A COATING OF THE SAME

BACKGROUND TO THE INVENTION

The present invention relates to a thermal spray material that provides abrasion resistance to aluminum alloy parts. The present invention also relates to a structure that has a coating of the same. More specifically, the present invention relates to a thermal spray material that provides abrasion resistance to cylinder bores (cylinder holes), valve lifters, valve sheets, pistons, or the like. The present invention is especially effective for use inside a cylinder bore.

Thermal spraying methods that provide abrasion resistance to aluminum alloy metal parts, particularly those using inexpensive iron type material for the cylinder bore sliding surface of an internal combustion engine, have been studied for a long time. For example, in Japanese Examined Patent publication 51-10183, Japanese Examined Patent Publication 51-18004, Japanese Examined Patent Publication 54-42855, Japanese Examined Patent Publication 57-13739, and Japanese Examined Patent Publication 57-34346, there are disclosed various carbon steels that are used for aluminum cylinders. Among these, Japanese Examined Patent Publication 51-10183 and Japanese Examined Patent Publication 54-42855 aim to improve abrasion resistance by using cast iron containing a large amount of carbon (C). In Japanese Examined Patent Publication 51-18004, by including 0.3–30 weight % (in the present specification, if there is no indication to the contrary, weight % is meant) of phosphorus (P), stadite ($Fe_3C$-$Fe_3P$-Fe) is generated to improve abrasion resistance. However, in methods where a carbon steel coating is formed on an aluminum cylinder, there is a problem of peeling of the coating due to the heat expansion difference between the base material and the coating.

In the specification for U.S. Pat. No. 3,077,659, there is disclosed thermal spraying of a mixture of powderized aluminum and powderized iron. In Japanese Examined Patent Publication 58-54189, there is disclosed a cylinder that is thermal sprayed with a mixture of an Al Si alloy metal, containing 16–40% Si, and a high carbon ferrochrome alloy. Japanese Laid-Open Patent Publication 54-2839 discloses a thermal spray method in which, after thermal spraying with a mixture of an Al-Si alloy containing 20–40% Si, and 50% or less of carbon steel, T6 processing is conducted. Furthermore, in Japanese Laid-Open Patent Publication number 7-62519, a mixture of Al with 15% Si and 50% carbon steel (0.8% C) is thermal sprayed. The thermal spray layer is then heated to a temperature less than the melting point of the thermal spray layer.

In Japanese Laid-Open Patent Publication Number 8-253856, a piston that is thermal sprayed with a mixture of carbon steel, an Al Si alloy containing 20% or less of Si, and a carbide of Hv 500–1500 or an alloy containing a carbide, is disclosed. These thermal sprays have reduced the heat expansion difference with the base material by mixing aluminum alloy powder with iron alloys. In the last four cases, the Al Si alloy for reducing the heat expansion difference contains 15–40% Si. As a result, the heat expansion difference reducing layer also has improved abrasion resistance. However, when used for a cylinder, bore thermal spraying does not achieve an adequate thermal spray temperature for melting the thermal spray particles. With high carbon ferrochrome alloy or the usual carbon steel and cast iron, an adequate bonding between particles in the mixture thermal spray coating is not achieved. There are problems of chipping particles, abrasion, and the like.

Improvements are necessary for increasing the bonding between particles of the mixture thermal spray coating, not only with iron materials, but also with aluminum materials. In order to improve the abrasion resistance, in the invention disclosed in Japanese Laid-Open Patent Publication Number 8-253856, three types of powder are mixed, but it is difficult to distribute each of the component materials evenly within the coating. In Japanese Laid-Open Patent Publication Number 6-240436, in order to create a uniform distribution within the coating, the use of aluminum and iron based metal (such as cast iron or iron-molybdenum alloy) as a composite powder is disclosed. However, in order to make a composite powder, it is necessary that each of the powders of the aluminum and iron based metal are very fine particles. This raises the cost of the powder. Furthermore, because the reactivity of aluminum and iron based metals are high, there is the accompanying danger of a dust explosion. As a result, the handling of very fine particles by themselves should be avoided.

OBJECTS AND SUMMARY OF THE INVENTION

It is an object of the present invention to provide a thermal spray material which overcomes the aforementioned problems.

It is a further object of the present invention to provide a low cost thermal spray material that has excellent abrasion resistance and seize resistance.

It is another object of the present invention to provide a bore spraying thermal spray material that has excellent abrasion resistance and seize resistance.

It is yet another object of the present invention to provide a thermal spray material that has adequate adhesive strength to a base material at high temperatures.

It is still a further object of the present invention to provide a thermal spray material that maintains bonding strength between its particles at high temperatures.

It is another object of the present invention to provide a sliding member which has been coated with the thermal spray material of the present invention.

Briefly stated, the present invention relates to a thermal spray material which includes a mixture of 5–30 weight % of an AlSi alloy powder with 95–70 weight percent of a cast iron powder to provide abrasion resistance for aluminum alloy parts. The AlSi alloy powder contains 12–30 weight % Si, at least one element selected from a group consisting of 0.5–5.0 weight % Cu and 0.2–3.0 weight % Mg, 1–15% of at least one element selected from the group consisting of Fe, Mn, and Ni, and a mass balance of Al. The cast iron powder contains 2–4 weight % C, no more than 0.3 weight % Si, and 0.5–3.0 weight % P. A sliding surface of a sliding member is thermal sprayed with a coating of this thermal spray material to provide a sliding member having excellent abrasion resistance.

According to an embodiment of the present invention, there is provided a thermal spray material comprising a mixture of 5–30 weight % Al Si alloy powder, the alloy powder having 12–30 weight % Si, at least one element selected from the group consisting of 0.5–5.0 weight % Cu and 0.2–3.0 weight % Mg, and 1–15% of at least one element selected from the group consisting of Fe, Mn, and Ni; and 95–70 weight % of cast iron powder, the cast iron powder having 2–4 weight % C, 0.3 weight % or less Si, and 0.5–3.0 weight % P.

According to a feature of the present invention, there is provided a structure having a sliding surface of a sliding member coated with a composition comprising a mixture of 5–30 weight % Al Si alloy powder, the alloy powder having 12–30 weight % Si, at least one element selected from the group consisting of 0.5–5.0 weight % Cu and 0.2–3.0 weight % Mg, and 1–15% of at least one element selected from the group consisting of Fe, Mn, and Ni; and 95–70 weight % of cast iron powder, the cast iron powder comprising 2–4 weight % C, 0.3 weight % or less Si; and 0.5–3.0 weight % P.

The above, and other objects, features and advantages of the present invention will become apparent from the following description read in conjunction with the accompanying drawings, in which like reference numerals designate the same elements.

DETAILED DESCRIPTION OF THE INVENTION

Figure 1:
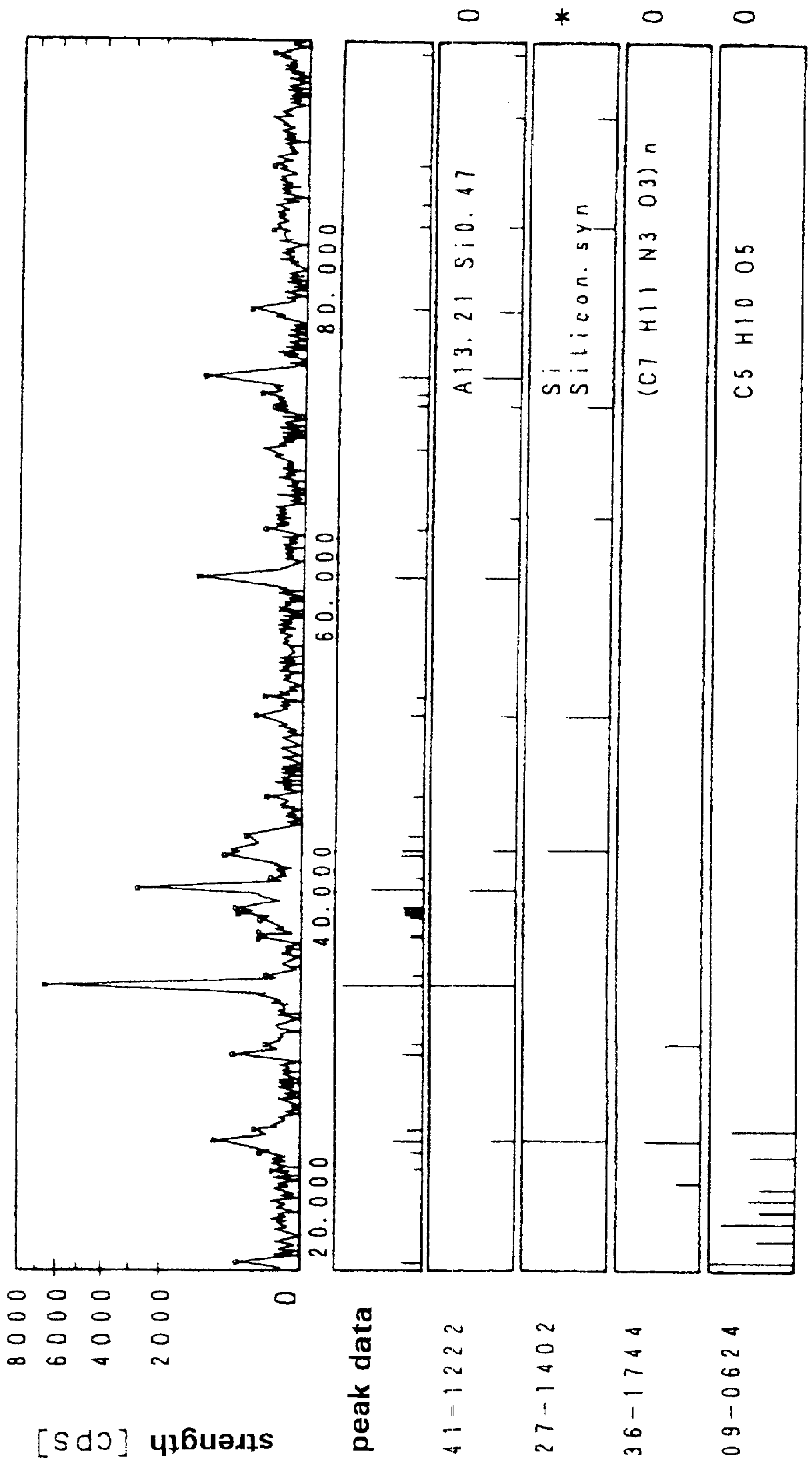
FIG. 1 is a graph showing the X-ray diffraction results of an AlSi alloy granulated powder according to an embodiment of the present invention.

Embodiments of the thermal spray material and the structure that is coated with the thermal spray material are described. By preparing the composition of the present invention, the abrasion resistance, the seize resistance, and the adhesion resistance of the thermal spray coating is improved. By further refining of the composition of the present invention, the AlSi alloy powder has improved bonding strength between particles at the time of coating formation as well as having improved tenacity of the materials. The composition of the present invention, even in situations when an adequate thermal spray distance can not be achieved, such as with bore thermal spraying, by having adequate fluidity of the droplets, the bonding strength between particles is improved. Furthermore, by forming a thermal spray coating while suppressing the breakdown of $Fe_3C$ (cementite) in the raw material powder, a thermal spray coating with excellent abrasion resistance and seize resistance is formed. The thermal spray coating also has adequate adhesive strength and maintains adequate bonding strength between particles even when there is a repeated heat load inside an engine.

The components of the thermal spray material are described in detail in the following paragraphs.

AlSi Alloy Powder

Each of the various components of the AlSi alloy were determined as described below.

If the Si content within the AlSi alloy is 12 weight % or less, the composition would be below the eutectic point, and the initial Si crystal for providing the abrasion resistance would not achieved. As a result, an adequate abrasion resistance is not obtained. Furthermore, if Si exceeds 30%, the solid capacity of the Si and the other components becomes too large, resulting in brittleness. Cu, Mg, Fe, Mn, and Ni contribute to the strength of the AlSi alloy at high temperatures. By including at least one of 0.5–5.0% Cu and 0.2–3.9% Mg, the alloy powder has excellent high temperature strength up to 150 degrees C. Furthermore, by including at least one element selected from the group consisting of Fe, Mn, and Ni, the AlSi alloy has excellent high temperature strength up to 250 degrees C. In thermal spraying, coatings which are formed by rapid heating and rapid cooling can absorb heat of approximately 150–200 degrees C at the time of a coating formation of another part. As a result, these components, which have excellent high temperature strength, are needed. Therefore, when each of the components is less than its lower limit value, the hardness of the thermal spray coating is reduced. When the upper limits are exceeded, the solid capacity becomes too large, and the coating becomes brittle.

Atomized powder, which has been rapidly cooled and solidified, is appropriate for thermal spraying due to its uniformity of components. However, atomized powder of AlSi alloy is likely to result in a powder which is very fine. Such a fine powder can become a hindrance to supply at the time of thermal spraying. Additionally, the powder can clog passages within the thermal spray gun. As a result, classification by a sieve is usually conducted.

In classification by a sieve, in order to remove the problematic fine powder, the powder is classified with a 400 mesh, preferably with a 325 mesh. For example, in Japanese Laid-Open Patent Publication Number 54-28239, classification is conducted with a 400 mesh, and in Japanese Examined Patent Number 58-54189, with a 350 mesh. A 350 mesh is preferred because of clogging of the sieve, which is seen as a limit for an industrially inexpensive sieving. Furthermore, when handling fine powder of aluminum, there is an accompanying danger of a dust explosion. From that standpoint as well, a sieve that is finer than 400 mesh should be avoided. Besides using a sieve, there is also an air scattering method of classification. However, with a fine powder which contains aluminum powder, the danger of dust explosion is high. Therefore, the air scattering method is not used.

In the bore thermal spraying of a mixture of AlSi alloy powder and iron alloy powder, a better coating is formed by mixing a powder that is of a fineness that does not cause problems with powder supply or clogging. A fine powder becomes sufficiently melted even without achieving an adequate thermal spray distance. Each of the powders is finely distributed within the coating, thus achieving a denser coating. Therefore, in order to improve the coating properties, it becomes necessary to include powder finer than 325 or 400 mesh in the particles. Furthermore, classifying atomized particles can worsen the tenacity of the powder, causing the overall cost to rise.

In order to solve these problems, the present invention uses AlSi alloy particles granulated with an organic binder. As the organic binder, substances which are incinerated in the thermal spraying step, such as ethylene bis steroamide, polyvinyl alcohol, polyvinyl acetate, methyl cellulose, ethyl cellulose, or the like, are preferred. The organic binder does not remain in the coating after thermal spraying. By granulating the problematic fine powder at the time of supply of the thermal spray material, the powder can be smoothly supplied. Furthermore, by having the organic binder adhere to the powder, the fluidity of the powder itself is improved.

Once inside the thermal spray frame, the organic binder is immediately incinerated and the particles of the granulated powder are dispersed. As a result, the fine molten particles are taken in within the coating, forming an ideal mixture coating with finely dispersed fine AlSi alloy and cast iron.

There is a conventional method (Japanese Laid-Open Patent Publication Number 6-240436) of making a composite powder by granulating the AlSi alloy together with cast iron. However, in order to create this composite powder, it is necessary to make fine powders of each. Because of problems of poor tenacity and the like, the cost can rise. In addition, the process of mixing a fine powder of highly reactive Al and Fe is dangerous and should be avoided.

Cast Iron

It is known that the abrasion resistance of cast iron can change depending on its carbon (C) content. In the present invention, the content of carbon within the cast iron is 2.0–4.0%. If C is 2.0% or less, the powder does not have a chill crystal. Because the amount of target $Fe_3C$ is small, an adequate abrasion resistance is not obtained. Furthermore, if C is 4% or greater, the amount of $Fe_3C$ becomes too large, resulting in a brittle spray coating.

The content of Si in the cast iron is 0.3% or less. If 0.3% or greater of Si is added to chilled cast iron powder which contains a large amount of $Fe_3C$, at the time of thermal spray coating formation, the $Fe_3C$ breaks down, to generate graphite. The graphite acts as an impurity that can reduce the bonding strength between particles of the thermal spray coating. As a result, the generation of graphite should be suppressed as much as possible. Furthermore, if there is decomposition of $Fe_3C$, the coating hardness is reduced, resulting in inadequate abrasion resistance.

With the above C and Si contents, the viscosity of the droplets is high. At the time of the thermal spray coating formation, it is difficult for wetting to take place between particles. This causes the bonding strength between particles to be reduced. Particularly in situations when an adequate thermal spray distance is not achieved, such as in bore thermal spraying, there is a need to improve the fluidity of the droplets. In order to improve the fluidity of the droplets, phosphorus (P) is added. The added amount of P is 0.3–3.0%. If P is 0.3% or less, the effect is poor. If the amount of P is 3.0% or greater, the coating becomes brittle.

Mixing Ratio

The mixing ratio of AlSi alloy powder and cast iron powder is 5–30% AlSi alloy and 70–95% cast iron. If the cast iron is greater than 95%, it is less effective at dispersing the AlSi alloy, resulting in a problem in the adhesive strength to the base material. Peeling of the coating may result from a thermal spray coating containing greater than 95% cast iron. Furthermore, if more than 30% of the AlSi alloy is mixed, the volume ratio in the coating exceeds 50 volume %, and problems with abrasion resistance may result.

Thermal Spray Method

In the present invention, there are no limitations in the thermal spray method. Conventional thermal spray methods such as plasma thermal spray, H.V.O.F (high velocity oxygen fuel thermal spray), arc thermal spray, and gas thermal spray, are preferred. The present invention is particularly effective when used with unfavorable thermal spray methods such as bore thermal spray.

Examples of the base material for the sliding member of the present invention include aluminum alloy cast products or expanded materials. The thermal spray is applied to the sliding members of a cylinder bore, valve lifter, valve sheet, a piston, or the like. When used for a cylinder bore, by making the cylinder bore sleeveless, a higher performance is anticipated. The sleeveless cylinder bore is lighter, more compact, and has better heat conduction as compared with a cast iron sleeve cylinder.

Embodiment 1

The following samples were prepared as the thermal spray material. Sample 1 was an AlSi alloy prepared from 20% Si, 3.3% Cu, 1.3% Mg, and 5% Fe. Sample 2 was an AlSi alloy prepared from 12% Si, 3.4% Cu, 1.2% Mg, and 5% Fe. Comparative sample 1 was an AlSi alloy prepared from 12% Si. The remaining ingredient of each of the above three samples was Al. Each of the above 3 types of samples were thermal sprayed onto an aluminum base material (AC4C T6 processing) under the conditions of Table 1. Coating cross section hardness HV (Vickers Hardness) was measured. The measurement results are shown in Table 2.

TABLE 1

Thermal Spray Conditions

| | | | |
|---|---|---|---|
| Supply current | 800 A | Traverse velocity | 200 mm/sec |
| Main gas flow rate (Ar) | 56.8 l/min | movement pitch | 2 mm |
| Auxiliary gas flow rate (He) | 7.6 l/min | thermal spray distance | 30 mm |
| Powder supply gas flow rate (Ar) | 5.3 l/min | thermal spray angle | 45 deg |

TABLE 2

Results of coating cross section hardness measurements

| | HV0.3 |
|---|---|
| Sample 1 | 279 |
| Sample 2 | 256 |
| Comparative Sample 1 | 122 |

All of the measurement results are the average values from measuring 10 points. Samples 1 and 2 are a result of thermal spraying components based on the present invention. Samples 1 and 2 have a coating hardness of 250 HV0.3 or greater. Compared with this, the coating hardness of Comparative Sample 1 does not reach 130 HV0.3. This is because Comparative Sample 1 does not contain components such as Cu, Mg, and Fe. When Cu, Mg, and Fe, or the like, are present, the rapid heating and rapid cooling at the time of thermal spray coating formation cause the Cu, Mg, Fe, and the like, to become a solid in the coating matrix, thereby hardening the matrix. The abrasion resistance of a coating is directly related to the hardness of the matrix, and therefore, the abrasion resistance is improved by including Cu, Mg, and Fe. In the present experiment, Fe was mixed, but Ni and Mg can also be used with the same effect.

Embodiment 2

The following samples were prepared as the thermal spray material. AlSi alloy containing 20% Si, 3.3% Cu, 1.3% Mg, and 5% Fe was prepared using three types of powder, each having differing particle sizes.

An AlSi alloy granulated powder containing 20% Si, 3.3% Cu, 1.3% Mg, and 5% Fe was prepared. The alloy was granulated with ethylene bis steroamide. The particle size distribution for each of the powders is shown in Table 3. The remainder of both AlSi alloy and AlSi alloy granulated powder was Al.

TABLE 3

| Sample | Powder particle size distribution | | | |
|---|---|---|---|---|
| | 90 μm or greater | 75–90 μm | 45–75 μm | 45 μm or less |
| AlSi alloy 1 | 3.7% | 3.9% | 13.6% | 78.8% |
| AlSi alloy 2 | 5.8% | 14.5% | 29.7% | 50.0% |
| AlSi alloy 3 | 6.2% | 19.9% | 43.0% | 30.9% |
| AlSi alloy granulated powder | 4.7% | 4.0% | 20.7% | 70.6% |

Three types of powder with differing particle sizes were created by changing the atomizing conditions of the AlSi alloy. When AlSi alloys 1–3 are thermal sprayed under the conditions of Embodiment 1, the AlSi alloy powder melted and clogged the powder spray opening of the thermal spray gun during the manufacture of the samples of these powders. This occurs because of poor fluidity as a result of the presence of fine powders. Such a problem can not be completely addressed by changing the atomizing conditions. Therefore, in order to thermal spray the AlSi alloy, some processing such as classification, or granulation, or the like, is necessary. However, with classification processing, even if the alloy powder is classified at 45 micrometers, 30% of the powder will have to be thrown out, thereby rapidly increasing the cost of the alloy powder.

Referring to Table 3, by granulating the AlSi alloy with the organic binder, ethylene bis steroamide, the particle size shifts toward larger sizes. When the granulated alloy powder is thermal sprayed under the conditions of Embodiment 1, the clogging that occurred with AlSi alloys 1–3 does not occur. The granulated powder contains a large amount of particles that is of a smaller size than alloys 2 and 3, but because an organic binder covers entirely covers, the fluidity is improved. Therefore, by granulation processing, all of the atomized powder, rather than only larger sized particles, can be used in thermal spraying. By having a large amount of an even finer powder, a good coating performance is achieved even in situations where an adequate thermal spray distance is not achieved, such as in bore thermal spraying.

Figure 2:
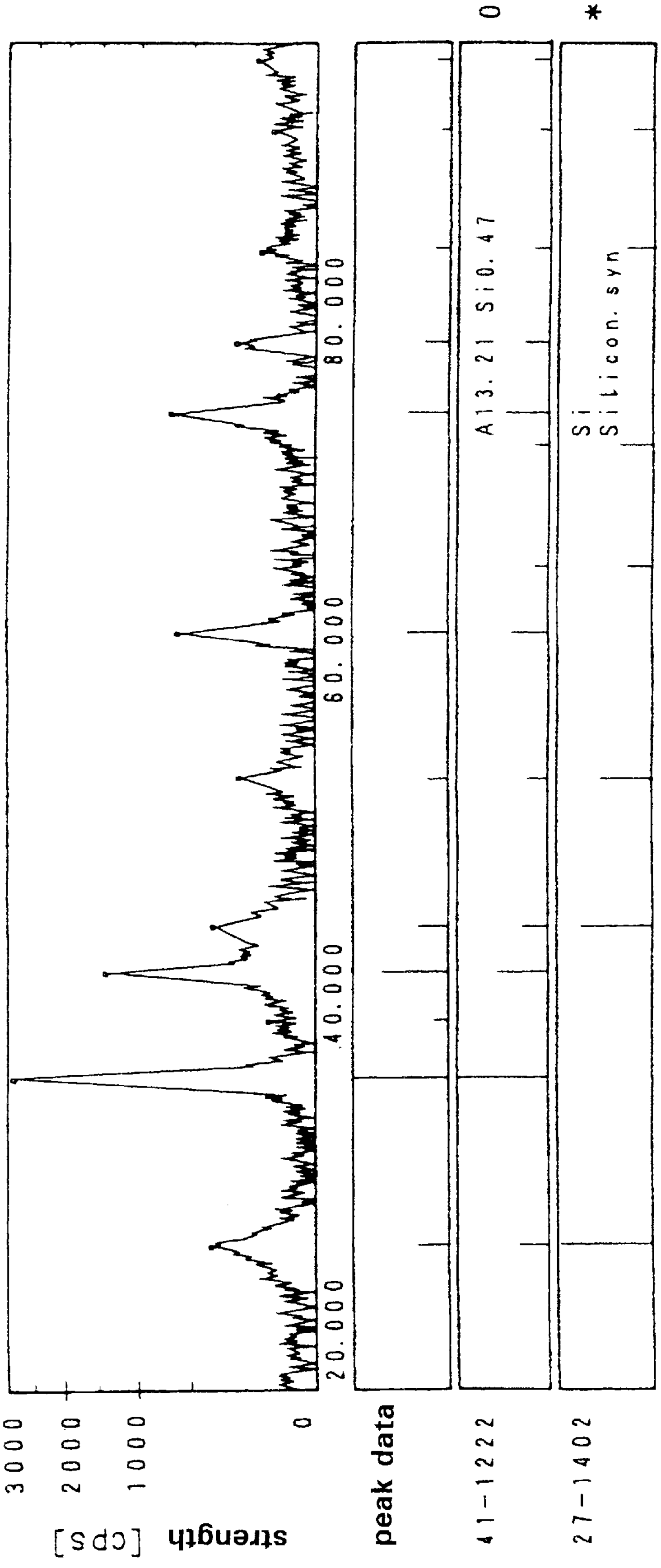
FIG. 2 is a graph showing the X-ray diffraction results of an AlSi alloy granulated powder thermal spray coating according to an embodiment of the present invention.
Figure 3:
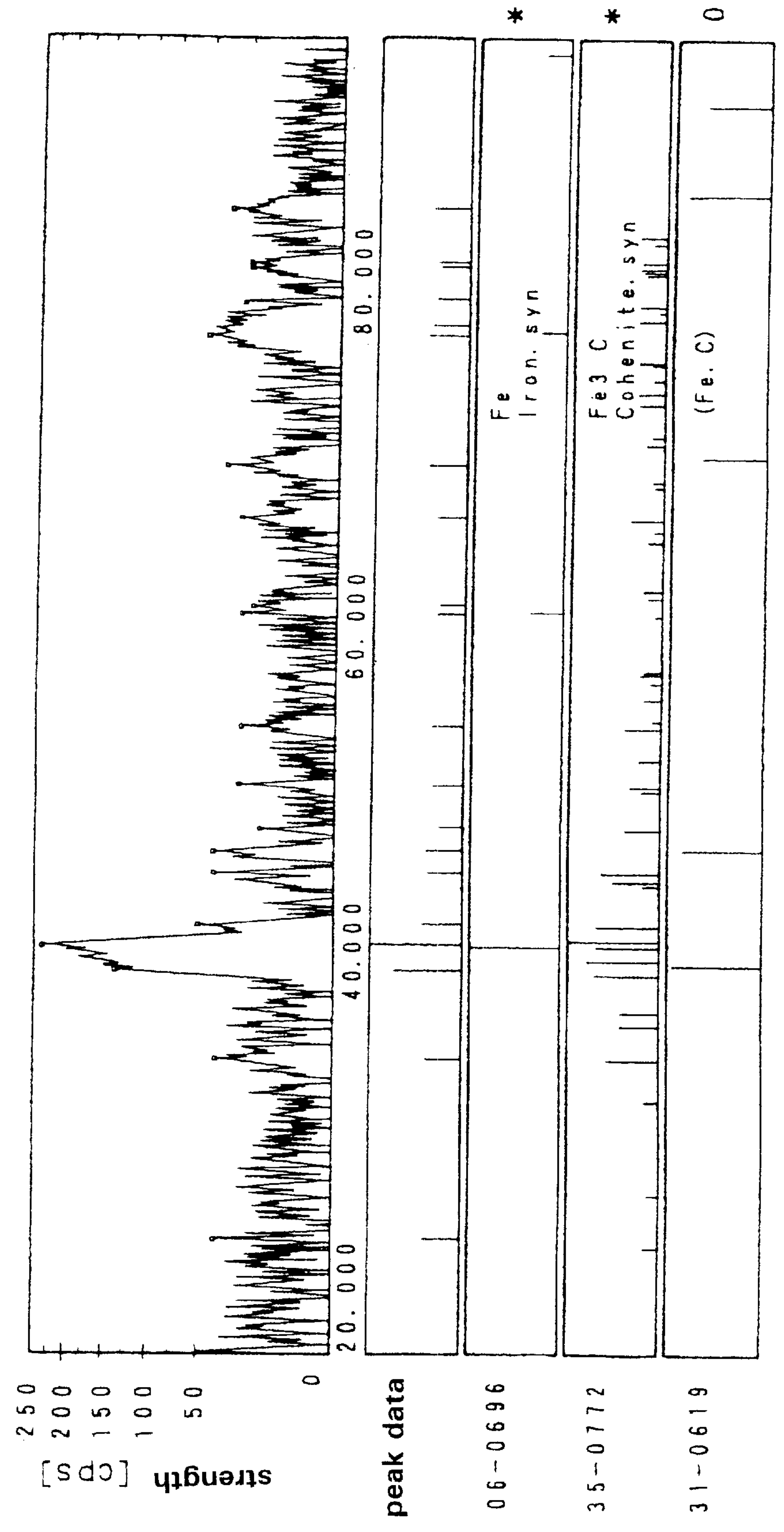
FIG. 3 is a graph showing the X-ray diffraction results of a first cast iron powder according to an embodiment of the present invention.
Figure 4:
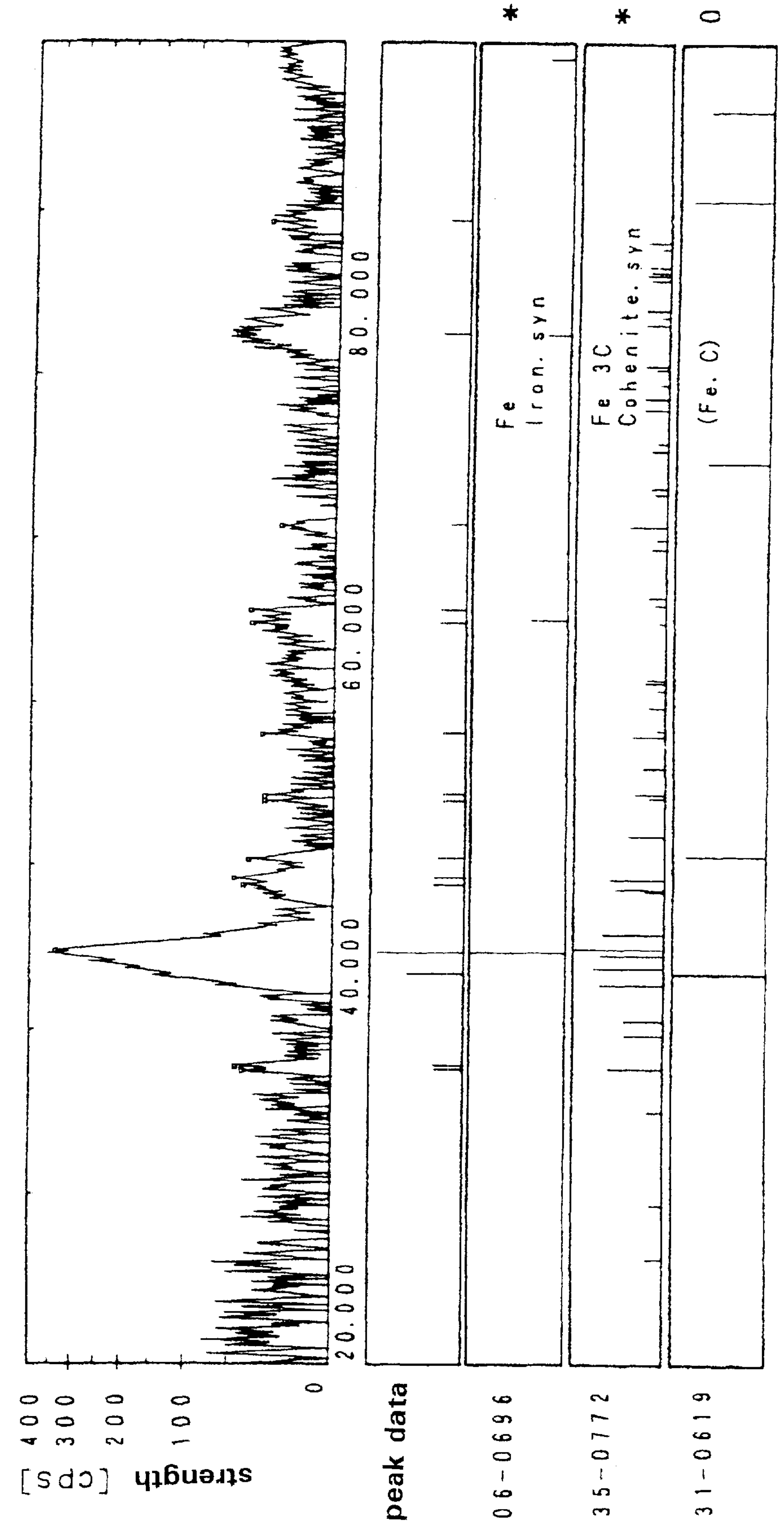
FIG. 4 is a graph showing the X-ray diffraction results of a second cast iron powder according to an embodiment of the present invention.
Figure 5:
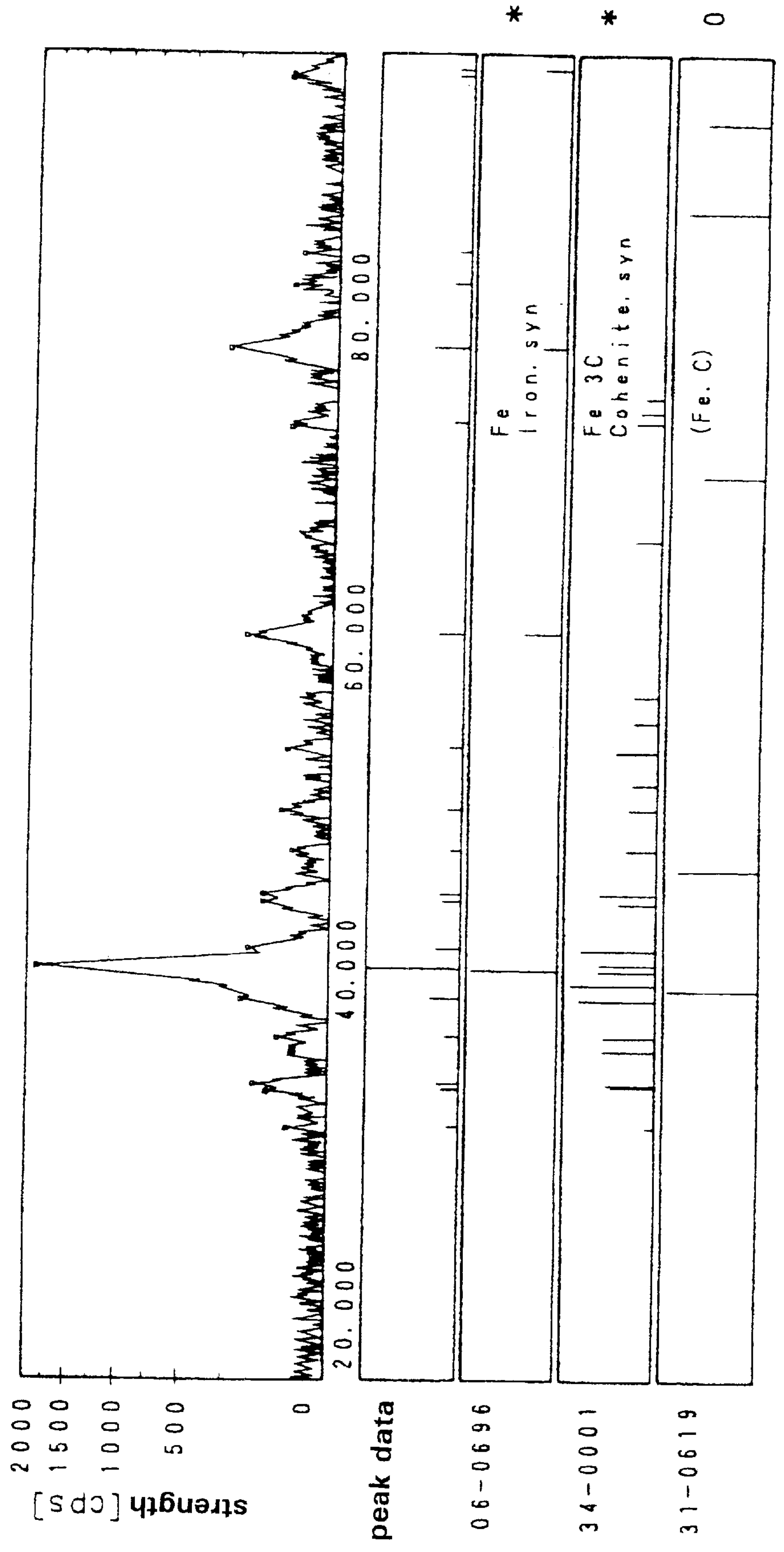
FIG. 5 is a graph showing the X-ray diffraction results of a first cast iron thermal spray coating according to an embodiment of the present invention.
Figure 6:
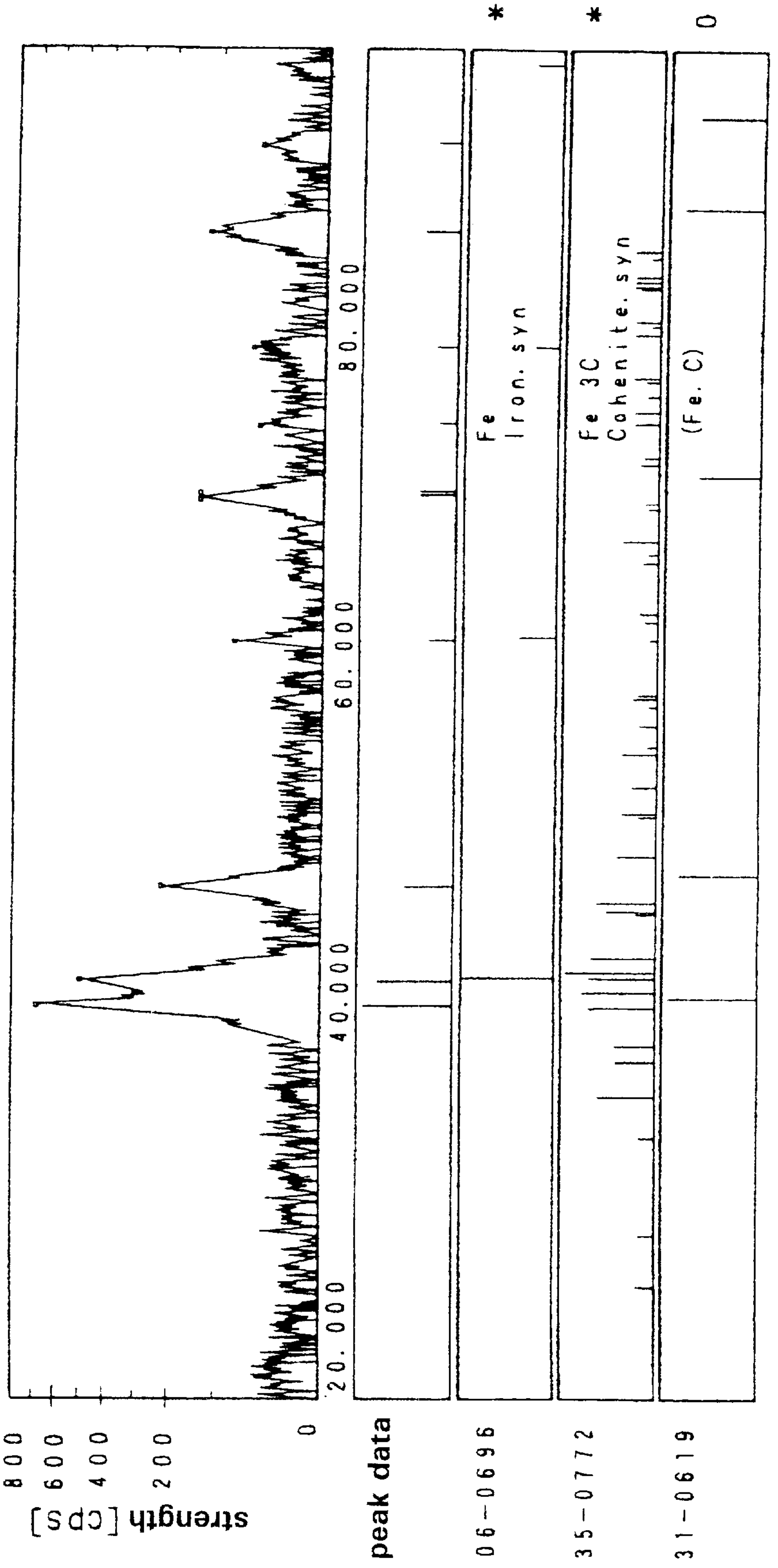
FIG. 6 is a graph showing the X-ray diffraction results of a second cast iron thermal spray coating according to an embodiment of the present invention.

Referring to FIGS. 1 and 2, X-ray diffraction results are shown of the AlSi alloy granulated powder and of the thermal sprayed coating of this powder that has been thermal sprayed under conditions of Embodiment 1. As is evident from these results, the organic binder which was present at the powder stage is no longer present in the thermal sprayed coating.

Embodiment 3

In order to examine the differences due to the particle size of the AlSi alloy powder, the following powders were used to create Sample 3 and Comparative Sample 2. AlSi alloy 1' was prepared from 20% Si, 3.3% Cu, 1.3% Mg, and 5% Fe. The powder was classified to 45 micrometer or greater. AlSi alloy granulated powder was prepared from 20% Si, 3.3% Cu, 1.3% Mg, and 5% Fe. The remainder of AlSi alloy 1' and AlSi alloy granulated powder was Al. The powder was granulated using ethylene bis steroamide. Cast iron 1 was prepared from 3.1% C, 0.03% Si, 0.97% P, and 0.018% S. The remainder of Cast iron 1 was Fe.

Sample 3 was prepared from a mixture of 20% AlSi alloy granulated powder with 80% cast iron 1. Comparative sample 2 was prepared from a mixture of 20% AlSi alloy 1' with 80% cast iron 1

Coatings were formed by a thermal spray of Sample 3 and Comparative Sample 2 according to the procedure of Embodiment 1. Coating cross-section hardnesses (HV1.0) were determined. Sample 3 had a hardness at 482 (HV1.0), whereas Comparative Sample 2 had a lower hardness at 429 (HV1.0). This is because Comparative Sample 2 did not contain AlSi particles as fine as that of Sample 3. The density of the coating and the bonding strength between particles in the thermal spray of Comparative Sample 2 was lower compared to Sample 3.

Embodiment 4

In order to study the differences due to iron material components, the following powders was used to make Sample 4 and Comparative Sample 3.

Cast iron 1 was prepared from 3.1% C, 0.03% Si, 0.97% P, and 0.018% S. Cast iron 2 was prepared from 3.0% C, 0.52% Si, 0.09% P, and 0.11% S. The remaining ingredient of cast irons 1 and 2 was Fe.

AlSi alloy granulated powder was prepared from 20% Si, 3.3% Cu, 1.3% Mg, and 5% Fe. The remaining ingredient of AlSi alloy granulated powder was Al. The powder was granulated using ethylene bis steroamide.

Sample 4 was prepared by mixing 20% AlSi alloy granulated powder with 80% Cast iron 1. Comparative sample 3 was prepared by mixing 20% AlSi alloy granulated powder with 80% cast iron 2.

Coatings were formed by the thermal spray conditions of Embodiment 1 with Sample 4 and Comparative Sample 3. Coating cross-section hardnesses (HV1.0) were determined. Sample 4 had hardness at 482 (HV1.0), whereas Comparative Sample 2 had hardness at 357 (HV1.0). Even with a load of 1.0 kgf, Sample 4 had clean rhombus-shaped pressure marks, whereas Comparative Sample 3 had splitting between particles with larger pressure marks. This is because the cast iron in Sample 4 contained 3.1%C and a reduced Si concentration of 0.03%, resulting in $Fe_3C$ (cementite) remaining in the coating thereby improving the coating hardness. Furthermore, by having 0.97% P, the fluidity of the droplets was improved. There was good wetting with the coating that was already formed, and the bonding strength between particles was heightened.

In contrast, Comparative Sample 3 had 3.0% C and 0.52% Si. As a result, there was decomposition of $Fe_3C$ (cementite), and formation of graphite. As a result, the bonding strength between particles was weakened.

Referring to FIGS. 3–6, in order to confirm the presence or absence of $Fe_3C$, the X-ray diffractions of the powders and coatings of cast irons 1 and 2 are shown. In the powder stage, the peak that shows the presence of $Fe_3C$ in both cast irons 1 and 2 remains when only cast iron 1 is made into a coating and disappears when cast iron 2 is made into a coating. Furthermore, with cast iron 1, which contains 0.97% P, the peak for stadite ($Fe_3C$—$Fe_3P$—Fe) could not be detected.

Embodiment 5

In order to study the effect of differing mixing ratios on the adhesive strength between the aluminum base material and the thermal spray coating, the adhesive strength was measured for various mixing ratios. For the experiment, the following powders were used to make Samples 5 and 6 as well as Comparative Sample 4. AlSi alloy granulated powder was prepared from 20% Si, 3.3% Cu, 1.3% Mg, and 5% Fe. The remaining ingredient in the AlSi alloy granulated powder was Al. The powder was granulated using ethylene bis steroamide. Cast iron 1 was prepared from 3.1% C, 0.03% Si, 0.97% P, and 0.018% S. The remaining ingredient of cast iron 1 was Fe.

Sample 5 was prepared by mixing 20% AlSi alloy granulated powder with 80% cast iron 1. Sample 6 was prepared by mixing 10% AlSi alloy granulated powder with 90% cast iron 1. Comparative Sample 4 was prepared from 100% cast iron 1.

The adhesive strength of each of the samples was measured by using the peeling method for adhesives. The results are shown in Table 4.

TABLE 4

| | Adhesive strength ($kgf/mm^2$) |
|---|---|
| Sample 5 | 4.6 |
| Sample 6 | 3.5 |
| Comparative Sample 4 | 2.9 |

Referring to Table 4, as the mixing amount of cast iron 1 increased, the adhesive strength decreased. With a coating of only cast iron 1, the adhesive strength was less than 3.0 $kgf/mm^2$.

Embodiment 6

In order to prove the effectiveness of the present invention, a bench test, using a two-wheel engine, was conducted. The bench test was conducted with thermal sprayed Sample 7 and Comparative Sample 5 using the following powders. An AlSi alloy granulated powder was prepared from 20% Si, 3.3% Cu, 1.3% Mg, and 5% Fe. The remaining ingredient of the AlSi alloy granulated powder was Al. The powder was granulated using ethylene bis steroamide. AlSi alloy 1' was prepared from 20% Si, 3.3% Cu, 1.3% Mg, and 5% Fe. The remaining ingredient in alloy 1' was Al. The powder was classified to 45 micrometer or greater.

Cast iron 1 was prepared from 3.1% C, 0.03% Si, 0.97% P, and 0.018% S. Cast iron 2 was prepared from 3.0% C, 0.52% Si, 0.09% P, and 0.11% S. The remaining ingredient in both cast irons 1 and 2 was Fe.

Sample 7 was prepared from mixing 20% AlSi alloy granulated powder with 80% cast iron 1. A cylinder block was thermal sprayed with Sample 7.

Comparative Sample 5 was prepared from mixing 20% AlSi alloy 1' with 80% cast iron 2. A cylinder block was thermal sprayed with Comparative Sample 5.

The cylinder block, having an aluminum alloy (AC4CT6 processed) base material, was blast processed with an alumina grid and thermal sprayed. The thermal spraying was conducted using a bore thermal spray gun under the conditions of Embodiment 1. Furthermore, after completion of thermal spraying, honing processing was conducted and each of the samples were finished.

Referring to Table 5, the engine specifications and test conditions of the bench test are shown.

TABLE 5

Bench test engine specifications and test conditions

| Engine type | | water-cooled 4 cylinder 4 cycle engine |
|---|---|---|
| Displacement | | 0.749 l |
| Compression ratio | | 11.8 |
| Cylinder bore diameter | | 72 mm |
| Piston ring | 1st | chrome plate |
| | 2nd | cast iron |
| | 3rd | chrome plate |
| test conditions | | 12,000 rpm, 120 PS, 10 hour running time |

Test Results

Figure 7:
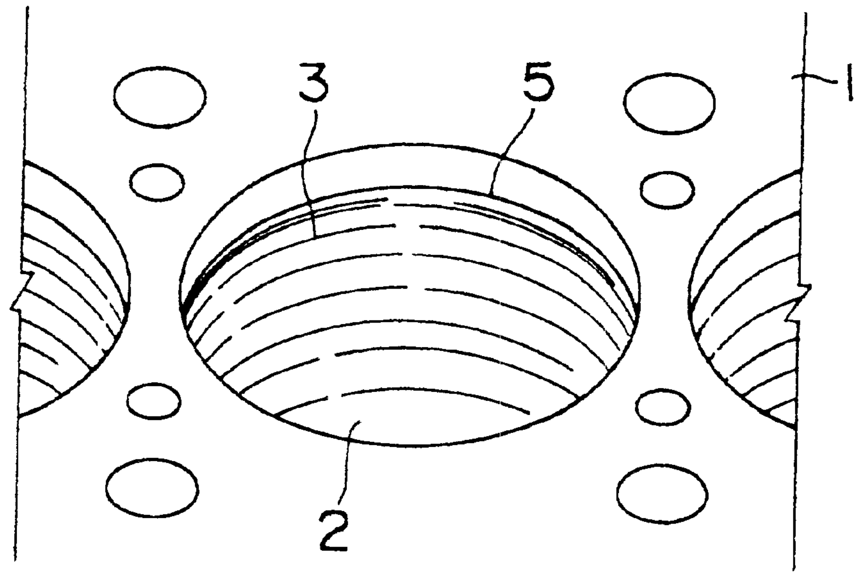
FIG. 7 is a perspective view, after a bench test, of a cylinder that has an inner wall coated with a thermal spray coating of the present invention.
Figure 8:
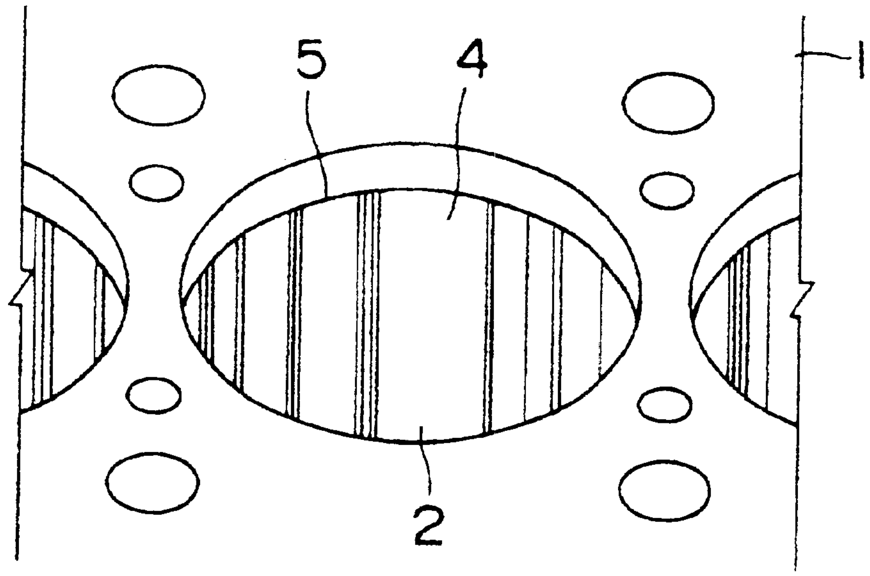
FIG. 8 is a perspective view, after a bench test, of a cylinder that has an inner wall coated with a coating according to the prior art.

Referring to FIGS. 7 and 8, an inner wall 2 of a cylinder 1 after coating with Sample 7 and Comparative Sample 5 are respectively shown.

Referring specifically to FIG. 7, positive results were obtained when the sliding surface of inner wall 2 of cylinder 1 was coated with Sample 7. Honing marks 3 still remained, and the diameter change was around 2 micrometer.

Referring specifically to FIG. 8, inner wall 2 of cylinder 1 had been coated with comparative sample 5. Because of the weakness of the bonding strength between particles, particles from the coating chipped off during the up and down motion of the piston (not shown), which acts as the sliding member. These particles became trapped between cylinder inner wall 2 and the piston or the piston ring. Because of the sliding, many vertical scratches 4 were generated on inner wall 2 of cylinder 1. Furthermore, these chipped off particles can go into the ring groove and can result in inferior sliding of the piston ring. When a longer test is conducted, it is predicted that other problems, such as the seizing of the piston ring or the like, will arise. From these results, it can be seen that bonding strength between particles is an important factor in thermal spray coating. Position 5 of cylinder 1 is the upper sliding position at an upper dead point of the piston.

As can be seen from the above, even in situations that are not ideal thermal spray conditions, such as with bore thermal spraying, the present embodiments have excellent abrasion resistance and seize resistance. The present invention provides a low-cost aluminum alloy sliding member that can maintain an adequate adhesion strength to the base material and an adequate particle bonding strength, even when there is a repeated heat load in the engine.

With the thermal spray material according to an embodiment of the present invention, by containing 12–30% of Si, the brittleness of the thermal spray coating is controlled, and a high abrasion resistance is maintained. Furthermore, the hardness of the thermal spray coating is increased. A coating having excellent high temperature strength is formed by using an AlSi alloy powder that contains the following: at least one element selected from the group of 0.5–5.0% Cu and 0.2–3.0% Mg; and 1–15% of at least one element selected from the group consisting of Fe, Mn, and Ni. By using cast iron powder containing 2–4% C, 0.3% or less of Si, and 0.5–3.0% of P, the formation of graphite is suppressed, and $Fe_3C$ (cementite) remains in the coating, thereby increasing coating hardness. By improving the fluidity of the droplets and by making the powder easily wettable with the coating which has already been formed, the bonding strength between particles is increased. Furthermore, by mixing 5–30% of AlSi alloy with 70–95% of cast iron, a coating with abrasion resistance and strong adhesive strength is obtained. With less than 70% cast iron, an adequate abrasion resistance is not obtained. With greater than 95% cast iron, there are problems in the strength of adhesion to the aluminum base material.

According to the thermal spray material of a feature of the present invention, the above AlSi alloy powder is an atomized powder. As a result, the components within each of the particles is uniform. Since each of the components is very finely dispersed, the powder flows easily as a solid solution at the time of coating formation. Furthermore, when granulated by an organic binder, the organic binder is eliminated at the time of coating formation. Furthermore, by making the AlSi alloy powder a granulated powder, the tenacity of AlSi alloy powder is improved, and even finer particles can be used in coating formation. As a result, a dense and well dispersed coating is formed.

According to a feature of the present invention, a sliding member is coated with the thermal material of the present invention. Since the sliding member is coated with the thermal spray material, the same advantages, as described above, are achieved. A coating with good bond with the base material, as well as between separate particles, is obtained. A sliding member that can withstand the both repeated heat loads from engine combustion and the sliding of the piston ring is obtained.

Having described preferred embodiments of the present invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A thermal spray material, comprising:

5–30 weight percent of an AlSi alloy powder;

said AlSi alloy powder containing 12–30 weight percent Si, at least one element selected from the group consisting of 0.5–5.0 weight percent Cu and 0.2–3.0 weight percent Mg, 1–15 weight percent of at least one element selected from the group consisting of Fe, Mn, and Ni, and the material balance being Al;

95–70 weight percent of a cast iron powder; and said cast iron powder containing 2–4 weight percent C, not more than 0.3 weight percent Si, 0.5–3.0 weight percent P, and the material balance being Fe.

2. A thermal spray material according to claim 1, wherein said AlSi alloy powder is a granulated powder.

3. A thermal spray material according to claim 2, wherein said granulated powder is an atomized powder granulated by an organic binder.

4. A thermal spray material according to claim 3, wherein said organic binder is selected from the group consisting of ethylene bis steroamide, polyvinyl alcohol, polyvinyl acetate, methyl cellulose, and ethyl cellulose.

5. A thermal spray material according to claim 4, wherein said organic binder is bis steroamide.

6. A method of making a structure having a sliding surface of a sliding member coated with a thermal spray material, comprising:

preparing an AlSi alloy powder containing 12–30 weight percent Si, at least one element selected from the group consisting of 0.5–5.0 weight percent Cu and 0.2–3.0 weight percent Mg, 1–15 weight percent of at least one element selected from the group consisting of Fe, Mn, and Ni, and the material balance being Al;

preparing a cast iron powder containing 2–4 weight percent C, not more than 0.3 weight percent Si, 0.5–3.0 weight percent P, and the material balance being Fe;

mixing 5–30 weight percent of said AlSi alloy powder with 95–70 weight percent of said cast iron powder to obtain a thermal spray composition; and applying said thermal spray composition onto said sliding surface.

7. A method of making a structure having a sliding surface of a sliding member coated with a thermal spray material according to claim 6, further comprising granulating said thermal spray composition with an organic binder.

8. A method of making a structure having a sliding surface of a sliding member coated with a thermal spray material according to claim 7, wherein said organic binder is selected from the group consisting of ethylene bis steroamide, polyvinyl alcohol, polyvinyl acetate, methyl cellulose, and ethyl cellulose.

9. A method of making a structure having a sliding surface of a sliding member coated with a thermal spray material according to claim 8, wherein said organic binder is bis steroamide.

10. A structure having on a sliding surface of a sliding member comprising:

a coating to coat said sliding surface;

said coating containing 5–30 weight percent of an AlSi alloy powder and 95–70 weight percent of a cast iron powder;

said AlSi alloy powder containing 12–30 weight percent Si, at least one element selected from the group consisting of 0.5–5.0 weight percent Cu and 0.2–3.0 weight percent Mg, 1–15 weight percent of at least one element selected from the group consisting of Fe, Mn, and Ni, and the material balance being Al; and said cast iron powder containing 2–4 weight percent C, not more than 0.3 weight percent Si, 0.5–3.0 weight percent P, and the material balance being Fe.

11. A structure having on a sliding surface of a sliding member according to claim 10, wherein said AlSi alloy powder is a granulated powder.

12. A structure having on a sliding surface of a sliding member according to claim 11, wherein said granulated powder is an atomized powder granulated by an organic binder.

13. A structure having on a sliding surface of a sliding member according to claim 12, wherein said organic binder is selected from the group consisting of ethylene bis steroamide, polyvinyl alcohol, polyvinyl acetate, methyl cellulose, and ethyl cellulose.

14. A structure having on a sliding surface of a sliding member according to claim 13, wherein said organic binder is bis steroamide.

* * * * *